(12) United States Patent
Nguyen et al.

(10) Patent No.: US 11,227,188 B2
(45) Date of Patent: Jan. 18, 2022

(54) COMPUTER SYSTEM FOR BUILDING, TRAINING AND PRODUCTIONIZING MACHINE LEARNING MODELS

(71) Applicant: Fair IP, LLC, Santa Monica, CA (US)

(72) Inventors: David Luan Nguyen, Playa Vista, CA (US); David Scott Boren, Woodland Hills, CA (US); Abhishek Barnwal, Santa Monica, CA (US); Babar Ali, Woodland Hills, CA (US)

(73) Assignee: FAIR IP, LLC, Santa Monica, CA (US)

( * ) Notice: Subject to any disclaimer, the term of this patent is extended or adjusted under 35 U.S.C. 154(b) by 677 days.

(21) Appl. No.: 16/056,155

(22) Filed: Aug. 6, 2018

(65) Prior Publication Data

US 2019/0042887 A1 Feb. 7, 2019

Related U.S. Application Data

(60) Provisional application No. 62/541,466, filed on Aug. 4, 2017.

(51) Int. Cl.
| | | |
|---|---|---|
| *G06K 9/62* | (2006.01) | |
| *G06N 20/00* | (2019.01) | |
| *G06N 7/00* | (2006.01) | |
| *G06N 5/00* | (2006.01) | |

(52) U.S. Cl.
CPC .......... *G06K 9/6257* (2013.01); *G06N 20/00* (2019.01); *G06N 5/003* (2013.01); *G06N 7/005* (2013.01)

(58) Field of Classification Search
CPC ...... G06K 9/6257; G06N 20/00; G06N 5/003; G06N 7/005
See application file for complete search history.

(56) References Cited

U.S. PATENT DOCUMENTS

| | | | |
|---|---|---|---|
| 2003/0139828 A1 | 7/2003 | Ferguson | |
| 2011/0071956 A1* | 3/2011 | Pinto | G06Q 10/067 705/348 |
| 2014/0344193 A1* | 11/2014 | Bilenko | G06N 20/00 706/12 |
| 2015/0170056 A1* | 6/2015 | Breckenridge | G06K 9/6227 706/12 |
| 2015/0339572 A1* | 11/2015 | Achin | G06Q 10/06 706/46 |

(Continued)

OTHER PUBLICATIONS

International Search Report and Written Opinion issued for International Application No. PCT/US18/45414, dated Oct. 29, 2018, 13 pgs.

*Primary Examiner* — Peet Dhillon
(74) *Attorney, Agent, or Firm* — Sprinkle IP Law Group

(57) ABSTRACT

A system for building, training and productionizing machine learning models is disclosed. A model training specification is received, and a plurality of sets of hyper-parameters is obtained. Sets of training data and hyper parameter sets are distributed to distributed training systems. Models are trained in parallel using different sets of training data. Models are trained using multiple sets of hyper parameters. A candidate hyper-parameter set is selected, based on a measure of estimated effectiveness of the trained predictive models, and a production predictive model is generated by training a predictive model using the selected candidate hyper-parameter set and the complete set of training data.

20 Claims, 12 Drawing Sheets

(56) References Cited

U.S. PATENT DOCUMENTS

| | | | |
|---|---|---|---|
| 2015/0379429 A1 | 12/2015 | Lee | |
| 2016/0078361 A1* | 3/2016 | Brueckner | H04L 67/10 |
| | | | 706/12 |
| 2016/0110657 A1* | 4/2016 | Gibiansky | G06N 20/00 |
| | | | 706/12 |
| 2016/0132787 A1* | 5/2016 | Drevo | G06N 20/10 |
| | | | 706/12 |

* cited by examiner

```
# training data definition
tu_training_data = fetch_training_data(
dependent_variable = {'name':
'AgencyAReportSoft_delinquent_60_days',
'version': '1p0'},
independent_variables = [
{'name': 'AgencyAReportSoft', 'dst_version': '1p0'}
{'name': 'IncomeReport', 'dst_version': '1p1'}
]
)
```

```
# learning transformation pipeline and machine learning algorithm
training_template = create_training_template(
training_data = tu_training_data,
transformations = [
['Drop columns with more than 90% null values', drop_columns_by_null_percent,
{'null_percent_threshold'}],
['Remove Highly Correlated Variables', drop_highly_correlated_variables,
{'correlation_threshold': 0.9}],
['Create credit worthiness feature', cluster_by_credit_worthiness,
{'number_of_clusters': 5}],
]
algo = {
'name': 'random_forest',
'params': {
'max_depth': RuntimeParam('max_depth'),
'colsample_bytree': RuntimeParam('colsample_bytree'),
'subsample': RuntimeParam('subsample'),
}
}
kfold=4,
random_seed=123
)
```

408
410

408

```
# hyper parameter optimization methodology and validation metric
hyper_parameter_optimization = create_hyper_parameter_search(
search_type = 'grid',
validation_metric = 'fbeta'
)
```

FIG. 4B

COMPUTER SYSTEM FOR BUILDING, TRAINING AND PRODUCTIONIZING MACHINE LEARNING MODELS

RELATED APPLICATIONS

This application claims priority under 35 U.S.C. § 119(e) to U.S. Provisional Application No. 62/541,466, filed Aug. 4, 2017, entitled "Computer System for Building, Training and Productionizing Machine Learning Models," which is fully incorporated herein by reference for all purposes.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

It is becoming increasingly common for network sites to employ computer-based decision systems to customize content provided to users via web pages, web applications, and mobile device applications. For example, a decision system may employ a software system, referred to as a rules engine, that executes rules in a runtime production environment to approve/disapprove users for accounts, determine which products/services to offer to users and make other decisions that affect the content provided to users. The rules may be based on regulations, company policies and other rules sources.

Decision systems may utilize machine-learning predictive models in making decisions. Training machine learning models, however, can be a computationally intensive task. The computationally laborious task of developing a production model is further compounded by the requirement to train many ancillary models not used in production but for the purposes of performance validation and hyper parameter tuning. This process may demand significant amounts of computational and developer time to manage the workflow in a statistically sound manner.

Typically, computer systems for training, validating and tuning machine learning models implement a serial process in which a model is trained, its out-of-sample performance is measured, and parameters are tuned and the cycle repeats itself. This can be accomplished serially on local machines or cloud-based machines. However, this process is time intensive and may result in long lead times before a machine learning model can be deployed into a production environment.

In some cases, machine learning models are developed by data scientists and then turned over to engineers to productionize the model—that is implement the model in a production environment. Data scientists often develop machine learning models using data that is of a different format or from different sources than the data that will be used in the production environment. Consequently, productionizing a machine learning model often requires substantial reprogramming of the production environment.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same components. The invention may be better understood by reference to one or more of these drawings in combination with the description presented herein. It should be noted that the features illustrated in the drawings are not necessarily drawn to scale.

FIG. 4A depicts a first portion of one embodiment of a model training specification.

FIG. 4B depicts another portion of one embodiment of a model training specification.

DESCRIPTION

Figure 1:
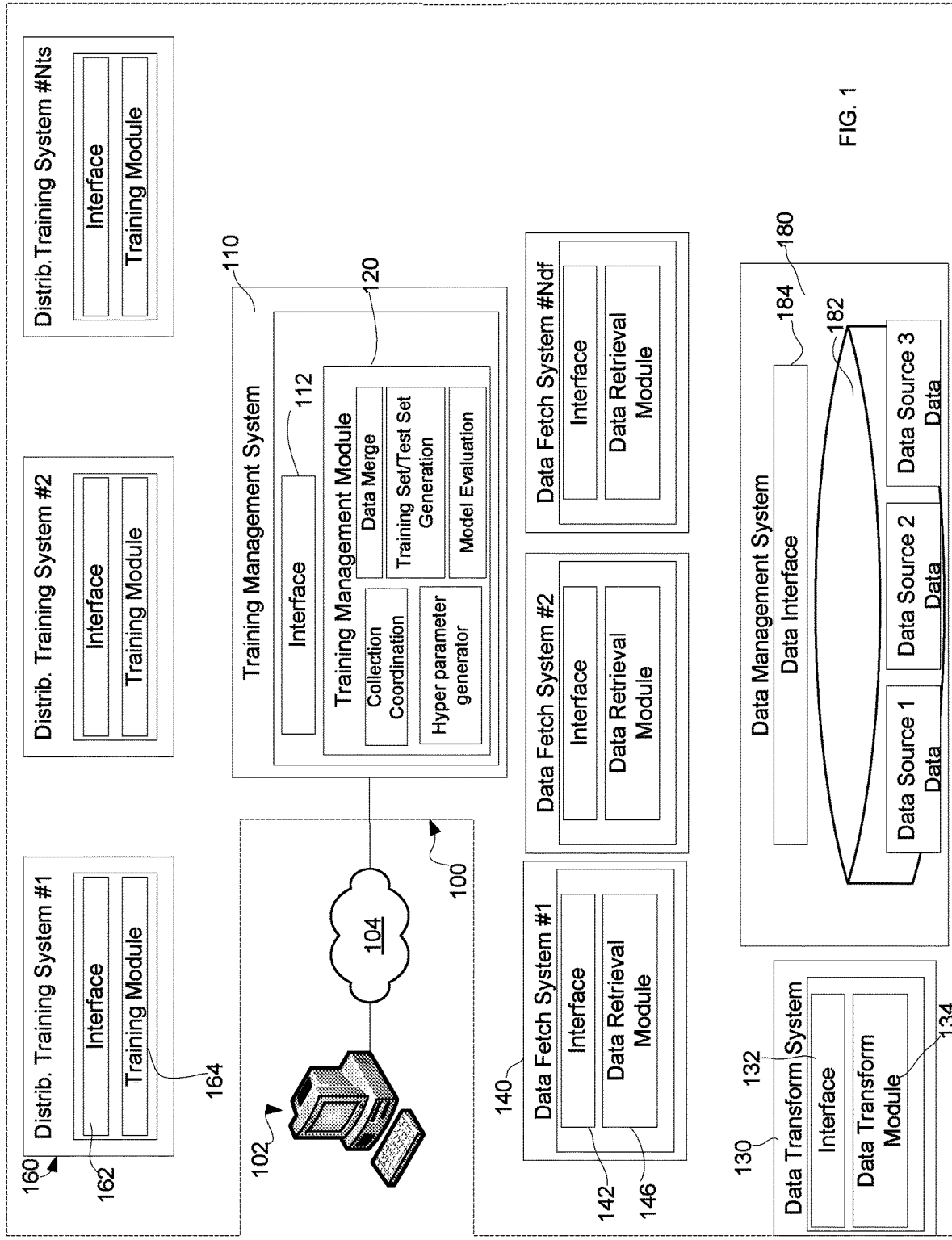
FIG. 1 is a block diagram illustrating one embodiment of an architecture for building, training and productionizing machine learning models.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Embodiments of the present disclosure provide systems for automatically building, training and productionizing predictive models that can be used to generate a predictive output. Embodiments of model building systems may include hyper parameter tuning of machine learning models. More particularly, embodiments provide systems for parallel fetching and preprocessing of training data and parallel training of models using a plurality of training systems. The training systems may be implemented on distributed machines. According to one embodiment, the training system may be implemented using virtual computing resources, such as virtual machines, containers or other virtual computing resources that execute code. The virtual computing resources may be provided on a cloud services platform.

Multiple virtual computing resources may each implement a model training system, including a data pipeline and a machine learning model. Each virtual computing resource can be trained and a virtual computing resource selected for deployment. The selected virtual computing resource can then be deployed in the production environment. For example, a virtual machine or container containing a trained model and pipeline can be deployed to the production environment.

In some embodiments, the training systems may be implemented using distributed software containers (e.g., DOCKER containers) (DOCKER is an open source container platform by DOCKER, INC. of San Francisco, Calif.) that may be used to run and manage applications side-by-side in isolated containers to achieve improved computing density. For example, multiple DOCKER containers may execute independently within a single instance of an operating system (e.g., avoiding overhead of starting and maintaining multiple virtual machines) or within multiple operating systems.

Embodiments of the systems and methods disclosed herein may be better explained with reference to FIG. 1 which depicts a modelling system 100 for training predictive models. The modelling system 100 may support multiple machine learning algorithms to train models including, but not limited to, generalized linear regression models (linear, logistic, exponential, and other regression models), decision trees (random forest, gradient boosted trees, xgboost), support vector machines and neural networks. Moreover, for a given machine learning algorithm, multiple different hyper-parameter search algorithms can be applied, including but not limited to grid search, randomized search and Bayesian optimization. In some embodiments, a set of hyper-parameters may be provided to the system (i.e., not as part of data being evaluated), and the hyper-parameters may help generalize models so that they are not over-fitting data (e.g., so that models are not memorizing data they are trained on, such that they then perform and predict poorly on data they have not seen before). Thus, the hyper-parameters may help generalize models so that when they are deployed, they may be able to perform well on data not seen before by the models.

In some embodiments, the models may be trained with a specific set of hyper-parameters in a distributed way, and then performance of that specific set may be determined, and then the specific set may be adjusted, models may be re-trained using the adjusted set, and so on, until a stopping criterion is met, that may be based on amounts of improvements to the iteratively trained models (e.g., using a convergence criterion), in terms of performance of each iteration of trained models. In this way, the system may determine an optimal set of hyper-parameters that may yield the best predictions. In some embodiments, the iterations may be terminated based on a predetermined maximal number of iterations. In some embodiments, brute force may be used, to train models on every possible combination of segmented portions (e.g., folds) of training data sets.

In some embodiments, a platform may provide plug and play capabilities for virtually any type of machine learning algorithm that may be desired, and thus it may be possible to use a variety of open source algorithms. For example, virtual machines or software containers may be configured with software for multiple different machine learning algorithms, and a user may simply select which machine learning algorithm(s) are to be used during execution. For example, each different machine learning algorithm may be associated with its own set of parameters set before training models on a training set. In some embodiments, a user (e.g., a data scientist) may provide input that includes an indication of a subject for prediction analysis, an indication of data to be used for the analysis, selection of a machine learning algorithm to be used and an indication of a hyper-parameter set for training and productionizing a model. The user may also specify how the input data may be cleaned. For example, if a credit bureau FICO score is null or zero, that FICO score may be transformed to another value, for example, to an average FICO score, so that the analysis results may be more realistic.

System 100 can be used to train models for various different applications such as to develop models for product recommendation, transaction risk prediction, fraud detection, content filtering, diagnostics or other applications. For illustrative purposes, system 100 will be described primarily in terms of developing models for a vehicle data system.

In FIG. 1, a client computing system 102 can communicate with modelling system 100 by way of a network 104. The network 104 can include one or more local area networks (LANs), a wide area network (WAN), such as the Internet, a wireless network, such as a cellular network, or a combination of all of the above. A user of a client computer system 102 may desire a trained predictive model that can receive input data from a client computing system or other input data and generate a predictive output. For example, a user may desire a model to predict whether a consumer using a vehicle data system will default on financing, can afford certain payments or for other purposes.

Modelling system 100 may comprise a network of one or more computer systems with central processing units executing instructions embodied on one or more computer readable media where the instructions are configured to perform at least some of the functionality associated with embodiments of the present invention. The computer systems of modelling system 100 may be interconnected by various methods of communication.

The instructions are executable to provide a software architecture comprising one or more components. In the topology of FIG. 1, the components are distributed to provide a training management system 110, a data transformation system 130, Nfs data fetch systems 140, Nts distributed model training systems 160, a data management system 180. The training management system 110, data transformation system 130, data fetch systems 140 and data management system 180, and/or model training systems 160 may be implemented on shared or separate hardware and shared or separate virtual computing resources (e.g., virtual machines, containers or other virtual computing resources) running in a cloud environment or otherwise. According to one embodiment, each Nfs data fetch system 140, Nts distributed model training system 160 is implemented as a separate virtual computing resource. It should be noted however, the topology of FIG. 1 is provided by way of example and not limitation and a single physical or virtual machine may provide one or more of a modelling management system 110, data transformation system 130, data management system 180, data fetch system 140 or distributed training system 160.

The training management system 110 includes interface 112. Interface 112 can be adapted to interface with components included in the modelling system 100 and the network 104, for example to interface with client computing device 102, data fetch systems 140, data transformation system 130, training systems 160 and/or data management system

180. It will be understood that the particular interface 112 utilized in a given context may depend on the functionality being implemented by system 110, the type of networks utilized to communicate with any particular system, the type of data to be obtained or presented, etc.

The training management system 110 further comprises a training management module 120 that is operable to coordinate data retrieval by data fetch systems 140 and model training by model training systems 160. Training management module 120 can be operable to apply multiple different hyper-parameter search algorithms and distribute hyper-parameters to model training systems 160. Multiple different hyper-parameter search algorithms can be applied, including but not limited to grid search, randomized search and Bayesian optimization.

A data transformation system 130 comprises an interface 132 adapted to interface with components included in the modelling system 100 and the network 104, for example to interface with client computing device 102, data management system 110, data fetch systems 140, training systems 160 and/or data management system 180. In particular, interface 132 may be adapted to receive historical data from one or more sources and communicate with data management system 110 to store data in a model training format. A data transformation module 134 can be operable to transform received historical data into a desired format.

A data fetch system 140 comprises an interface 142 adapted to interface with components included in the modeling system 100 and the network 104, for example to interface with client computing device 102, data management system 110, data transformation system 130, training systems 160 and/or data management system 180. In particular, interface 142 can be adapted to interface with training management system 110 to receive data retrieval requests and provide data to management system 110 and to interface with data management system 180. Data retrieval module 146 is operable to retrieve training data from data management system 180, perform preprocessing of training data and provide training data to training management system 110.

Although not shown in FIG. 1, a cache layer may be used to store data and intermediate results for the various systems, so that raw data or processed data that may have been processed by a first system may be easily and quickly retrieved by a next processing system that needs the results from the processing of the first system. For example, the first system may store a result of its processing in the cache layer, and may forward a link (e.g., an address) to the second system so that it may easily obtain the result from the cache layer. In turn, the second system may store a second result of its processing in another location on the cache layer, and may provide a link to that second result for another system to retrieve that second result (e.g., for further processing).

A model training system 160 comprises an interface 162. Interface 162 can be adapted to interface with components included in the modelling system 100 and the network 104, for example to interface with client computing device 102, data management system 110, data transformation system 130, data fetch systems 140 and/or data management system 180. In particular, interface 162 can be adapted to interface with training management system 110 to receive training data, model training parameters and other information and to provide trained models to training management system.

A training module 164 can receive training sets, test sets and hyper parameters and execute a machine learning algorithm to train a model. A training module 164 may support multiple machine learning algorithms including, but not limited to, generalized linear regression models (linear, logistic, exponential, and other regression models), decision trees (random forest, gradient boosted trees, xgboost), support vector machines and neural networks. Training module 164 may be further operable to evaluate trained models and return a trained model or metric of a trained model's effectiveness to management system 110.

Training a model may require a set of training data. To this end, a data management system 180—which, in one embodiment, may be a portion of a networked vehicle data system—may maintain a data store 182 storing a set of historical data that can be used as training data. While the historical data may be used to develop a model for a particular online (or other) environment, the historical data is not necessarily from that environment. For example, historical data used to train a credit risk model for a networked vehicle data system may include credit report data from a credit reporting service for a large group of individuals who may never have used the networked vehicle data system. Data management system 180 comprises an interface 184 adapted to interface with components included in the modelling system 100 and the network 104, to allow, for examples, components to retrieve data from data store 182.

The data used for training will depend on the application for which the model is being developed and may include data from a variety of internal and external information provider systems. Using the example of training a model for a networked vehicle data system or other system that offers financing, the historical data may include, for example, data from consumers' transactions and data from external information provider systems such as, but not limited to, fraud detection services, identity verification services, credit reporting services, financial institutions, income estimation modelling services and/or other sources for historical data.

The historical data can include initial historical data. Over time, new historical data may be made available for use as training data. For example, as users carry out transactions via a vehicle data system, the transaction data can be added to the historical data usable for training purposes. Historical data available for training may be updated on an ad hoc basis, periodically in batches, in a batch once a certain volume has accumulated, or otherwise.

The historical data can be in any convenient form that is understood by the modelling system 100. In accordance with one embodiment, historical observation data in data store 182 may be in a model training input format that matches the format in which a model trained on the data will receive observation data to be analyzed in the production environment. In other words, the model training input format of the training observation data may match the model input format of the production observation data.

Data transformation system 130 may transform historical data from an initial format to the model training input format that matches the format of the production observation data to which a resulting production model will be applied. Put another way, data transformation system 130 transforms historical data to the format used by a data pipeline for a model.

As an example, say a model is being trained for use in a networked vehicle data system to predict whether a person will default on a loan based on his/her "soft" credit report provided by a credit reporting agency (e.g., TransUnion, Inc. of Chicago, Ill., or other credit reporting agency) then the historical soft credit report data can be transformed to the format of soft credit report data to which the resulting production model will be applied in the production environment. Continuing with this example, say the credit reporting agency provides the current soft credit reports for individuals in an XML format and the production system in which a trained model will be implemented converts the XML format into a JSON format for processing by a decisioning system in the production environment. Further assume the credit reporting agency allows entities to purchase bulk historical observation data that includes records of anonymized credit report data for individuals with each record containing one or more columns of credit report information from the credit reporting agency for the individual from when the individual applied for a loan. It is further assumed in this example that the credit reporting agency provides historical records for the loans that include indicators of performance on the loan. The bulk historical data is provided in a format, such as CSV files, that is different than the JSON format used in the production environment. Data transformation system 130 can be configured with rules for mapping fields in the bulk historical credit data from when individuals applied for loans to a JSON record format used in the production system so that the historical observation data is formatted as if the historical data had been collected through the web service using real-time requests for current credit reports. This enables a model to be trained using the bulk historical observation data, but in the input format in which the data will appear in the production environment in which the model will be applied. As discussed below, this means that the same or similar pipelines can be applied in training and in production, simplifying deployment.

As another example, data may be transformed from values that make little or no sense to the various systems, to values that may make more sense. For example, a FICO score of zero may indicate that a person has not yet established a credit history sufficient to assign a valid FICO score. However, a zero FICO score may negatively impact the training of predictive models (e.g., because the zero score could be interpreted as a negative indicator of a person in the credit bureau database, instead of an indicator that the person may or may not be worthy of consideration for credit). Therefore, the zero (or null) FICO score may be transformed into another value (e.g., a non-zero score that may be considered as an average FICO score value).

As another example, data may be transformed from various values into an aggregated value that may be desirable for the models. For example, the raw data may include a debt value and an income value, and that data may be transformed by generating a debt-to-income ratio value for use in the data pipeline of the model.

In addition, data transformation system 130 may store values for dependent variables being modelled with historical data records. For example, data transformation system 130 may store an indicator of whether the individual was ever more than 60 days delinquent on the loan (e.g., a "0" in a fair_dlq60 column indicating "no" and a "1" in a fair_dlq60 column indicating "yes" for that record) in association with the JSON formatted record (or other observation data format record) containing data from when the individual applied for the loan. The dependent variable values may have been provided by the information provider or may have been derived therefrom. For example, the indicator of delinquency may be based on applying rules to the historical performance data associated with each loan.

The formatted historical data can be stored in data store 182 as raw training data. In some embodiments, the stored historical data may be categorized based on the data provider, format or other aspects of the data. For example, the JSON formatted records containing the historical observation data from credit reporting agency A and dependent variable data may be stored as "AgencyAReportSoft" records. In some embodiments, at least one categorization corresponds to a model data source (discussed below).

A model training system 100 may maintain model data source definitions that specify the source of data for a machine learning algorithm. According to one embodiment, a model data source encompasses a combination of a data management system, raw training data and a data source data pipeline to process the raw training data extracted from the data management system. For example, a model data source "AgencyAReportSoft version 1p0" may refer to AgencyAReportSoft records from data store 182 (e.g., the records for individuals where each record includes one or more columns of credit report information for the individual from when the individual applied for a loan and an indication of whether the individual later defaulted on the loan as discussed above) processed by a defined data pipeline 1p0. In some embodiments, the values for dependent and independent variables may be retrieved using different data sources, where the records can be correlated based on one or more attributes.

A data pipeline comprises data processing elements connected in series to extract raw training data from storage management system 180 and transform the raw data to a format used by the machine learning algorithm applied by a training module 164. A data pipeline, thus provides a defined way of transforming training data from the model training input format to the format used by the machine learning algorithm. As discussed below, the data pipeline may be frozen with a model generated using data processed by that pipeline and the same series of transformations used to transform the raw training data can be used, in some embodiments, to transform the production data input to a model that was generated using that pipeline. For example, the data pipeline may be provided in a software container, along with the machine learning algorithms. For example, the software container used for training one of the predictive models may ultimately be used as the production software container for the trained predictive model, and the data pipeline that was used for training the predictive model may then be used for the productionized predictive model.

During the training phase, a data pipeline can apply functions to the raw data records to process the data for use by a machine learning algorithm. Any number of transformations may be applied in a data pipeline. Non-numeric values may be mapped to numeric values, values in a range may be mapped to the same value, variables may be split, variables may be added (e.g., based on other variables) and other transformations may be applied in the data pipeline. The training data extracted via the data pipeline may be a set of records where each record includes values for input variables and corresponding values for the desired output(s) in the format used by the machine learning algorithm.

To provide an example, a machine learning algorithm may require that values of a variable in the input data be of a consistent type across records (e.g., a particular variable is always a number or is always a string), but the historical data may include a variable that changes in type. In such a circumstance, a data processing element in the data pipeline may be configured to ensure that the machine learning algorithm only receives variables that have a consistent type across records. Historical credit report records, for example, may include an attribute field, say a field for "AttributeX", in which the attribute value may be a number (e.g., 350-850) or a letter (e.g., "A"). Thus, some records may have numerical values for the AttributeX field and other records may contain characters in the Attribute X field. A data processing element in the data pipeline may be configured to split the AttributeX field into two fields: AttributeX_Num and AttributeX_Char. If the attribute value in a historical data record is a number, the data processing element can create entries of AttributeX_Num:number, AttributeX_char:null for that record; whereas, if the attribute value in the historical data record is a character, the data processing element can create entries of AttributeX_Num:null, AttributeX_char: character. In this example, if the value of AttributeX in a historical data record is 500, the data processing element can create entries of AttributeX_Num:500, AttributeX_char:null for that record; whereas, if the attribute value in a historical data record is "A", the data processing element can create entries of Attribute_Num:null, Attribute_char:A. The data pipeline can thus provide the machine learning algorithm with observation data having variable values that are of a consistent type across records.

The client computing system 102 can send a model training specification to modelling system 100 to initiate the training of a model. The model training specification can specify, for example, the dependent variable(s) for which the model is being developed, the data model data source to use, the machine learning algorithm to use and the hyper-parameter search space. Training management module 120 can invoke the virtual computing resources (e.g., virtual machines, containers) to fetch the data specified in the model training specification and virtual computing resources that implement the machine learning model to be trained and pipelines.

Modelling system 100 can fetch in parallel the various data source records as well as train the model and hyper parameter tune the model. Modelling system 100 can train multiple models using different tuning parameters to optimize the predictive performance of the model. For example, for a selection of a random forest algorithm, a user may specify a hyper parameter as a number of questions (e.g., 5) that may be asked using the input data, to reach a prediction. For example, the algorithm may analyze the data and formulate the 5 best questions (e.g., based on values of variables in the data) to ask the data (e.g., based on attribute values in the data) to reach the prediction of whether a person may be likely to default on a loan. For this example, the decision tree generates the questions, based on the data and the subject of the decision to be made (e.g., whether a person may default on loan). Thus, the training systems may start with 5 questions and adjust the hyper parameters in the iterations of training models.

For example, a user may desire to train a model to predict whether a potential consumer will become delinquent if provided financing. The model training specification may define a "fair_dlq60" variable as a dependent variable and identify a set of training data that includes records for individuals where each record includes one or more columns of credit report information for the individual from when the individual applied for a loan and an indication of whether the individual later defaulted on the loan (e.g., a "0" in a fair_dlq60 column indicating no and a "1" in a fair_dlq60 column indicating "yes" for that record). It can be noted that the training data and transformations of the data can be easily specified in some embodiments through reference to a model data source such as "AgencyAReportSoft version 1p0".

The model training specification can further specify a machine learning algorithm to use, a hyper parameter search algorithm to use, initial values for hyper parameter search or other information. The model training specification may also specify additional transformations (e.g., data cleaning) that can be appended to the data pipeline of the model data source.

Modelling system 100 can apply the selected machine learning algorithm to the training data to train a predictive model. Multiple different hyper parameter configurations can be applied in training, generating multiple different trained predictive models. The generated models (e.g., candidate generated models with candidate hyper parameter sets) can be evaluated and a particular trained model selected. For example, the evaluation may include an evaluation of the effectiveness of the candidate hyper parameter sets, based on the generated models, and the selection may be based on a measure of predictive performance that may be determined as an optimal measure of performance, for the set of candidate hyper parameter sets. The selected model can be made available to other processes. In one example, the predictive model developed by system 100 may be registered as a model for use by a decisioning engine such as described in U.S. Provisional Patent Application No. 62/520,597 filed Jun. 16, 2017, entitled "Computer System Decision Engine,", which is incorporated herein by reference in its entirety for all purposes or a decision engine as described in U.S. patent application Ser. No. 16/011,617 filed Jun. 18, 2018, entitled "Computer System Decision Engine", which is hereby fully incorporated herein by reference for all purposes.

According to one embodiment, training management module 120 ingests the model specification and implements collection coordination processes to coordinate the collection of the input data. In particular, training management module 120 is operable to determine the data sources and distribute collection and preprocessing of data to data fetch systems 140. Preprocessed data is distributed to model training systems 160 to train models in parallel.

FIGS. 2 and 3A-3G illustrate one embodiment of fetching data, preprocessing data and training models. According to one embodiment, fetching of data (204) may be performed by a set of virtual computing resources executing instances of data retrieval modules 146 in parallel and training models (210) may be performed by a set of virtual computing resources executing instances of model training module 164 in parallel. Training a model using optimized hyper parameters (214) may be performed by a virtual computing resource executing an instance of model training module 164 and may be one of the virtual resources that performed step 210. Other steps may be performed by one or more virtual computing resources implementing for example, processes of training management system 120.

Figure 2:
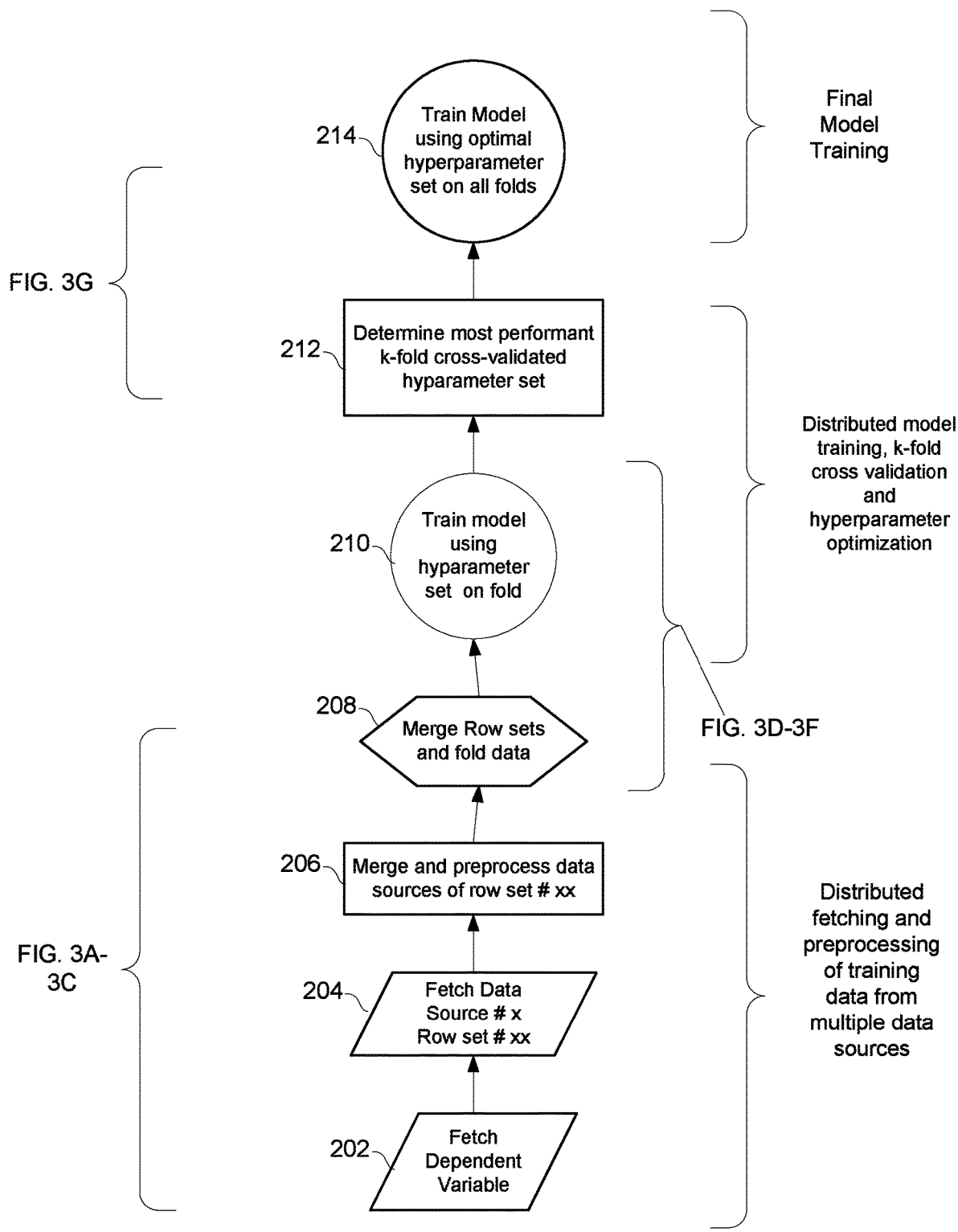
FIG. 2 is a block diagram illustrating one embodiment of dependencies among various systems for training machine learning models according to an embodiment.

FIG. 2 depicts dependencies among various systems for training machine learning models according to an embodiment. A plurality of the various systems may be distributed across virtual computing resources, for example, operating in parallel. Greater detail of the distributed systems is shown in FIGS. 3A-3G, as indicated in FIG. 2. With reference to FIG. 2 (portions of which are shown in greater detail in FIGS. 3A-3G), one step in data collection may be to collect (e.g., fetch) the dependent variable data (FIGS. 2, 3A) (202). In some embodiments, this step is not done through parallel data collection by data fetch systems 140 as it may be a relatively fast data query and may be performed by a single data fetch system 140. For example, fetching the data for the dependent variables (202) to train and predict whether a potential consumer will become delinquent, may simply involve retrieving two columns of data, a person ID column and the column that indicates whether the person was delinquent (e.g., in the example above, the fair_dlq60 column indicating if the person defaulted on the loan). The retrieved data may also be used to determine how many row sets to retrieve for independent variable data.

For independent variable data, training management module 120 may break up the records to be collected into chunks (e.g., row sets) based on a parameter. For example, training management module 120 may be configured with a parameter specifying a size for each chunk, or row set). Data management module may invoke a sufficient number of data fetch systems 140 to collect records for a given row set (FIGS. 2, 3A-3C) and assign the chunks to the data fetch systems 140. For example, data management module 120 may invoke virtual machines or containers implementing instances of a data fetch system 140 and assign chunks to each virtual computing resource. The data sources of the row sets may then be merged and preprocessed (206).

As discussed above, fetching operations (204) of FIG. 2 may be distributed among any number of data fetch systems 140, each data retrieval system comprising a virtual computing resource (e.g., a virtual machine, container or other virtual computing resource) executing an instance of a data retrieval module 146. For example, a first data fetch system 140 can be tasked with retrieving all the records corresponding to a particular row set of person_IDs and a second data fetch system 140 can be tasked with retrieving all the records corresponding to a second set of person_IDs. For example, a first row set of person_IDs may include IDs numbered 1-1000, while a second row set of person_IDs may include IDs numbered 1001-2000, and so on. A first data fetch system 140 can thus retrieve row set #1 corresponding to a particular set of person_IDs for each of the data sources specified, a second data fetch system 140 can retrieve, in parallel, row set #2 corresponding to a second set of person_IDs for each of the data sources specified and so on.

As another example, data fetch systems may be assigned row sets to retrieve based on data source. For example, a first data fetch system 140 may be assigned to fetch row set #1 from data source #1 and another data fetch system 140 may be assigned to fetch, in parallel, row set #1 from data source #2, and so on. As a more specific example, a first data fetch system can assigned to retrieve a credit report data set from a first credit reporting agency for a set of person_IDs, a second data fetch system can be assigned to retrieve an income estimate from an income estimation service for the set of person_IDs and a third data fetch system can be assigned to retrieve a driver's license information data set for the set of person_IDs. According to one embodiment, a given virtual computing resource (e.g., virtual machine, container or other virtual computing resource) may be assigned to query for a single row set for a single data source.

A data retrieval module 146 (FIG. 1) can merge the corresponding data for the various data sources (208). For example, if two data sources are specified in a model training specification, data retrieval modules can be assigned to merge rows corresponding to a first set of person_IDs from the different data sources into a first merged row set and, in parallel, merge rows corresponding to a second set of person_IDs from the different data sources into a second merged row set. The data retrieval modules 146 may also perform other preprocessing (e.g., data cleaning), such as eliminating highly correlated variables, converting columns of data that contain numeric data in some rows and alphabetical data in other rows into two columns of data such that one column is all numeric and the other column is all alphabetical data, converting all null values to 0, etc. For example, the first data fetch system 140 can merge row sets #1 for each data source to create merged records, eliminate highly correlated columns and perform other data transformations including, but not limited to, data source data pipeline transformations (transformations that are encompassed by the data sources specified in the model training specification) and additional data transformations specified in the model training specification.

In some embodiments, the data retrieval module 146 may store its retrieved and/or processed data in a caching layer (e.g., an AMAZON S3 caching layer). In some embodiments, the data retrieval module 146 may provide a pointer to its stored data in the caching layer, to other modules or recipients in the modelling system 100.

Training management module 120 receives the row sets from the distributed fetch systems 140 and can process the row sets to, for example, merge the row sets (208) from multiple data fetch systems 140. Training management module 120 may further coordinate training of models by Nts training systems 160 using the training data.

Training management module 120 is further operable to split the merged training data into a number of different training sets (sets containing different records) and provide the training sets to distributed training systems 160 (FIGS. 2, 3D-3F). A portion of the training data may be retained as a test set. According to one embodiment, training management module 120 is configured to randomly split the training data into k folds and provide k−1 folds to the training systems as training sets while retaining the kth fold as a test set. "k" may be specified in the model training specification. For example, if k is specified to have a value of 10, and the test set of data has 1 million items, then the training data may be randomly split into 10 folds, each fold including 100,000 items. For example, a fold value may be applied to a "fold" column of the data, with "1" randomly assigned to 100,000 items, "2" randomly assigned to another 100,000 items, etc., until there are 10 different folds, each fold comprising 100,000 items of the test data, each fold having different data from each of the other folds. For example, the folds may be stored in the caching layer (discussed above) for easy access by processing systems. For example, during training, each model may be trained using 9 folds (i.e., 900,000 items) and then validated using the tenth fold (i.e., "holdout" fold for that model's training).

Figure 3A:
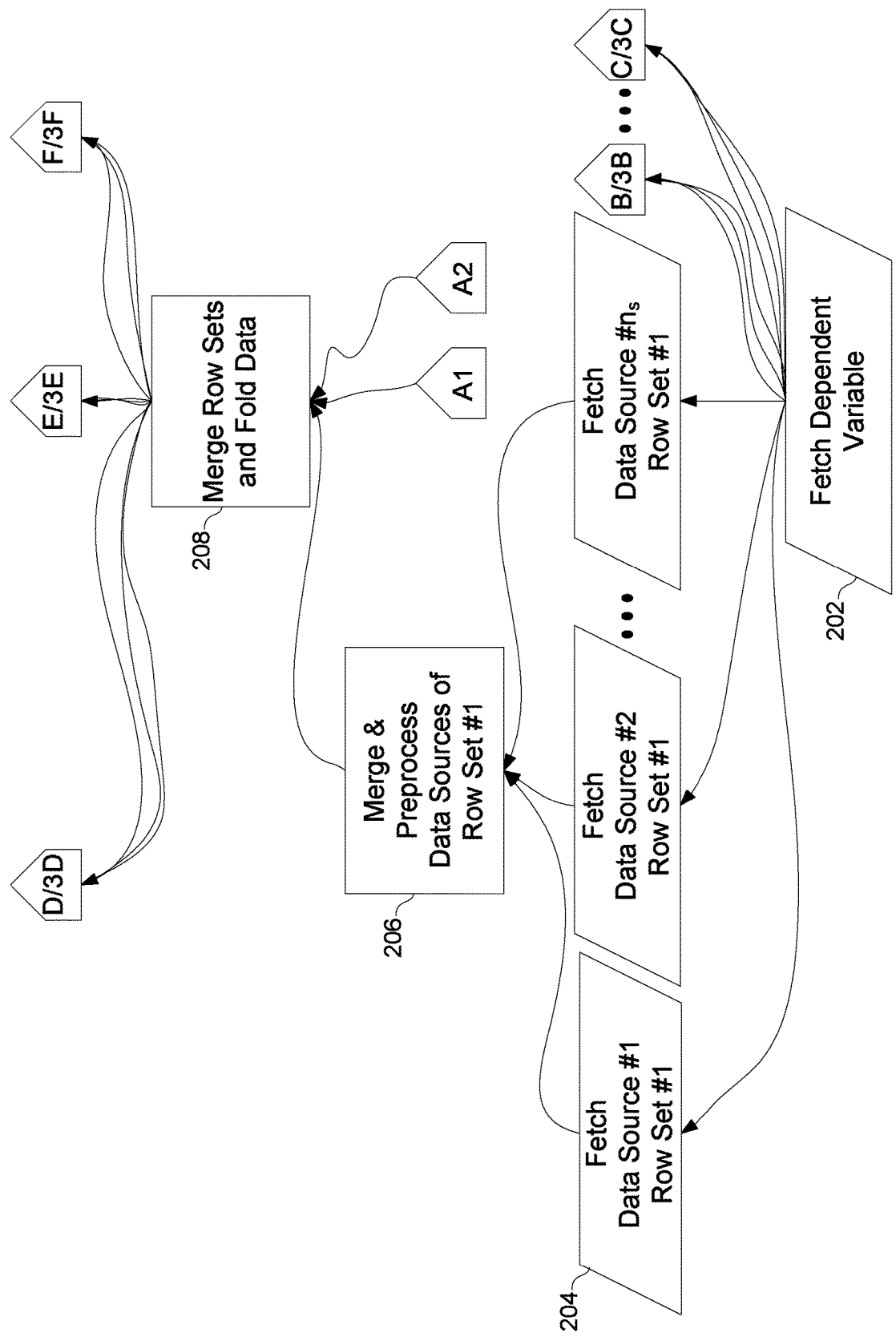
FIG. 3A illustrates one embodiment of a system fetching, merging and preprocessing data in parallel.
Figure 3B:
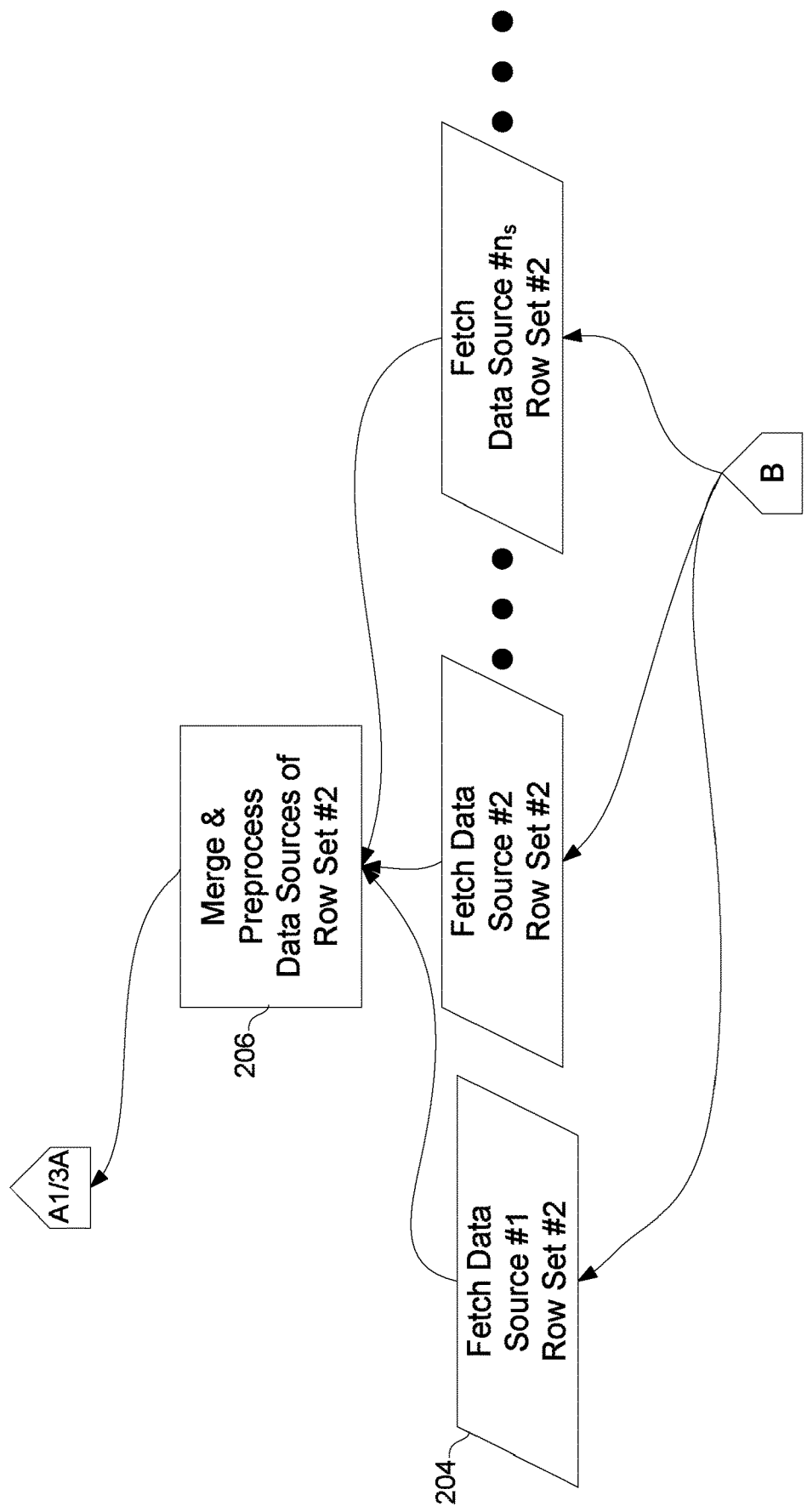
FIG. 3B illustrates one embodiment of the system further fetching, merging and preprocessing data.
Figure 3C:
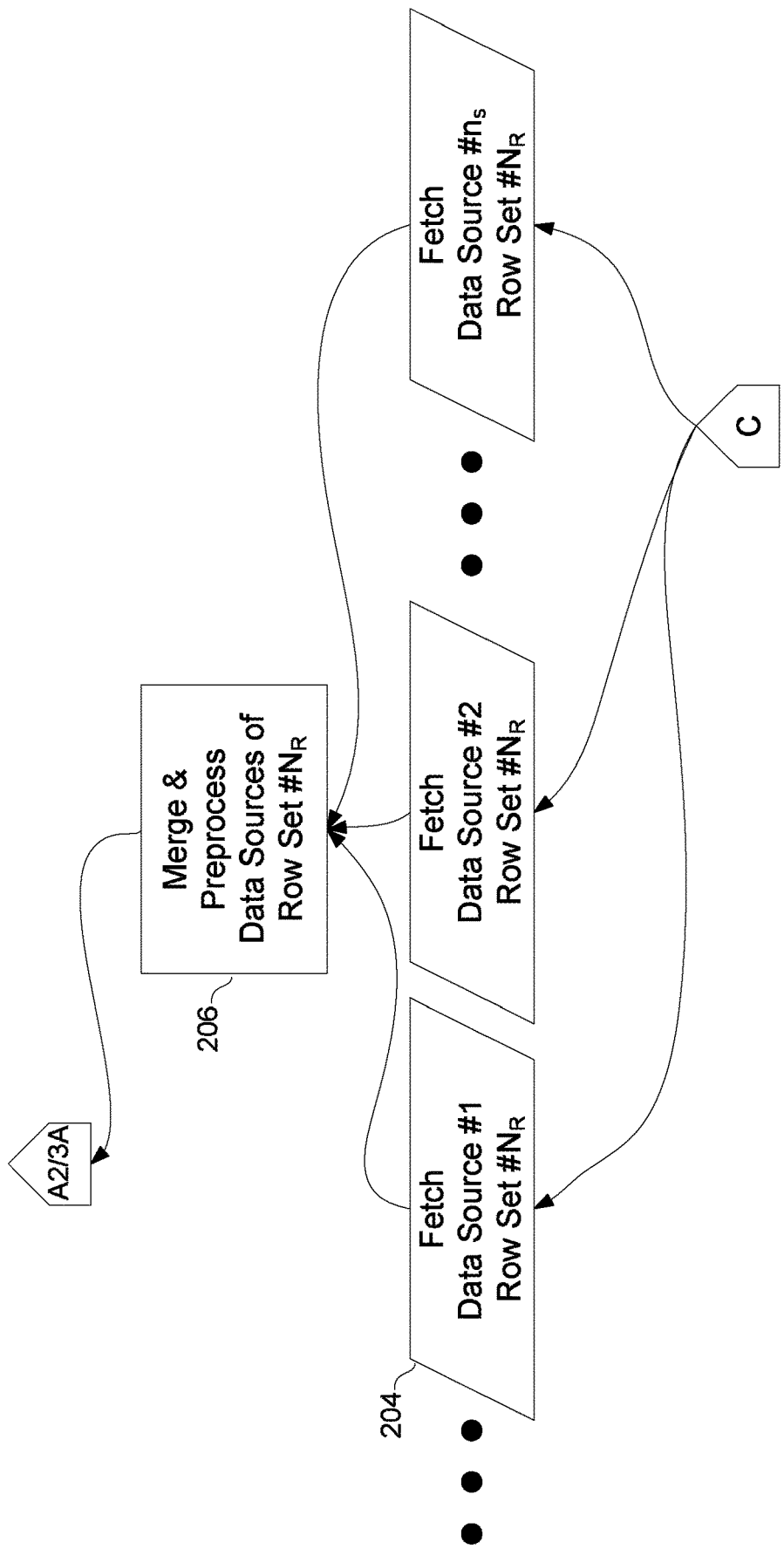
FIG. 3C illustrates one embodiment of the system further fetching, merging and preprocessing data.
Figure 3D:
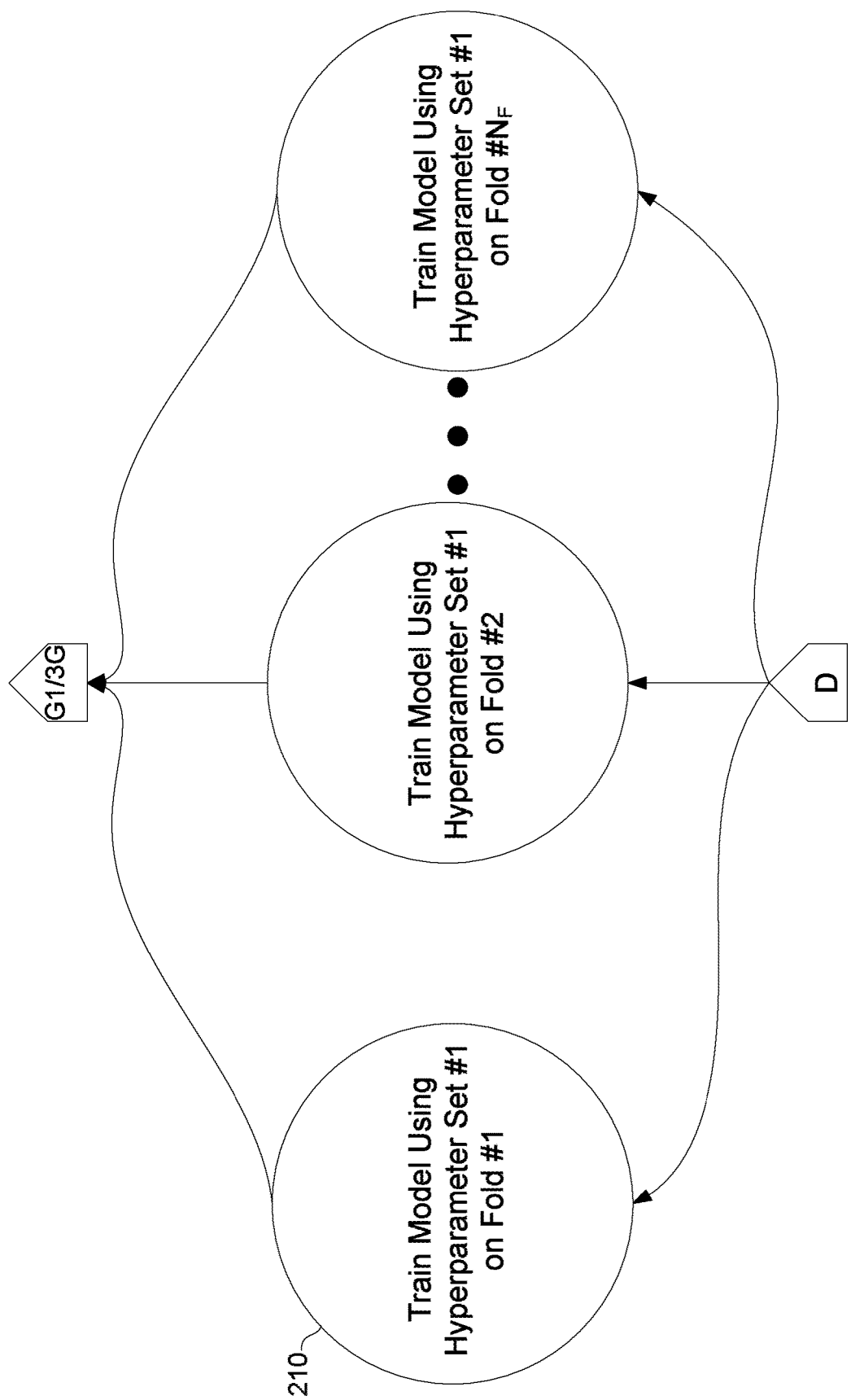
FIG. 3D illustrates one embodiment training predictive models in parallel.
Figure 3E:
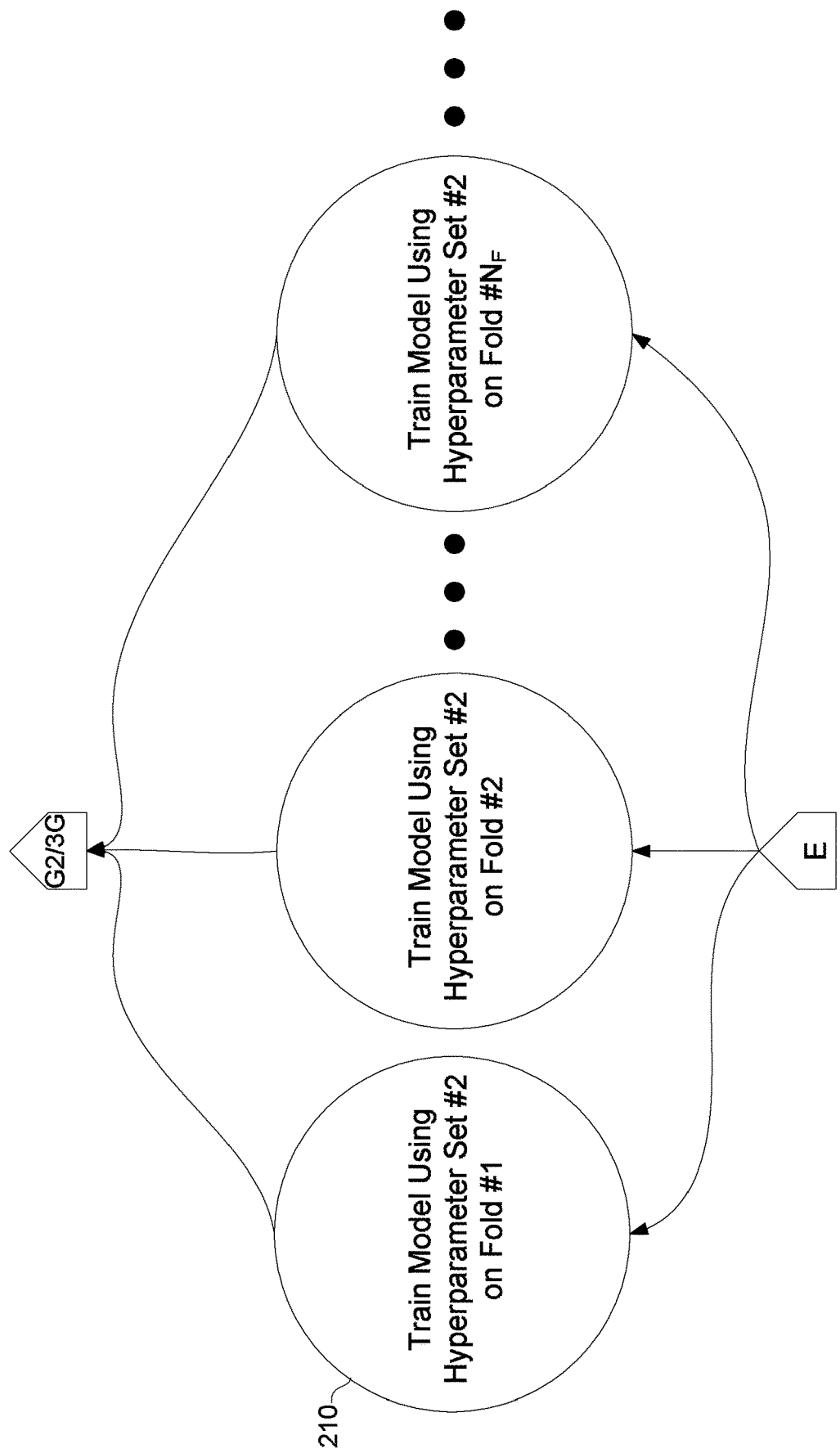
FIG. 3E illustrates one embodiment of training predictive models in parallel.
Figure 3F:
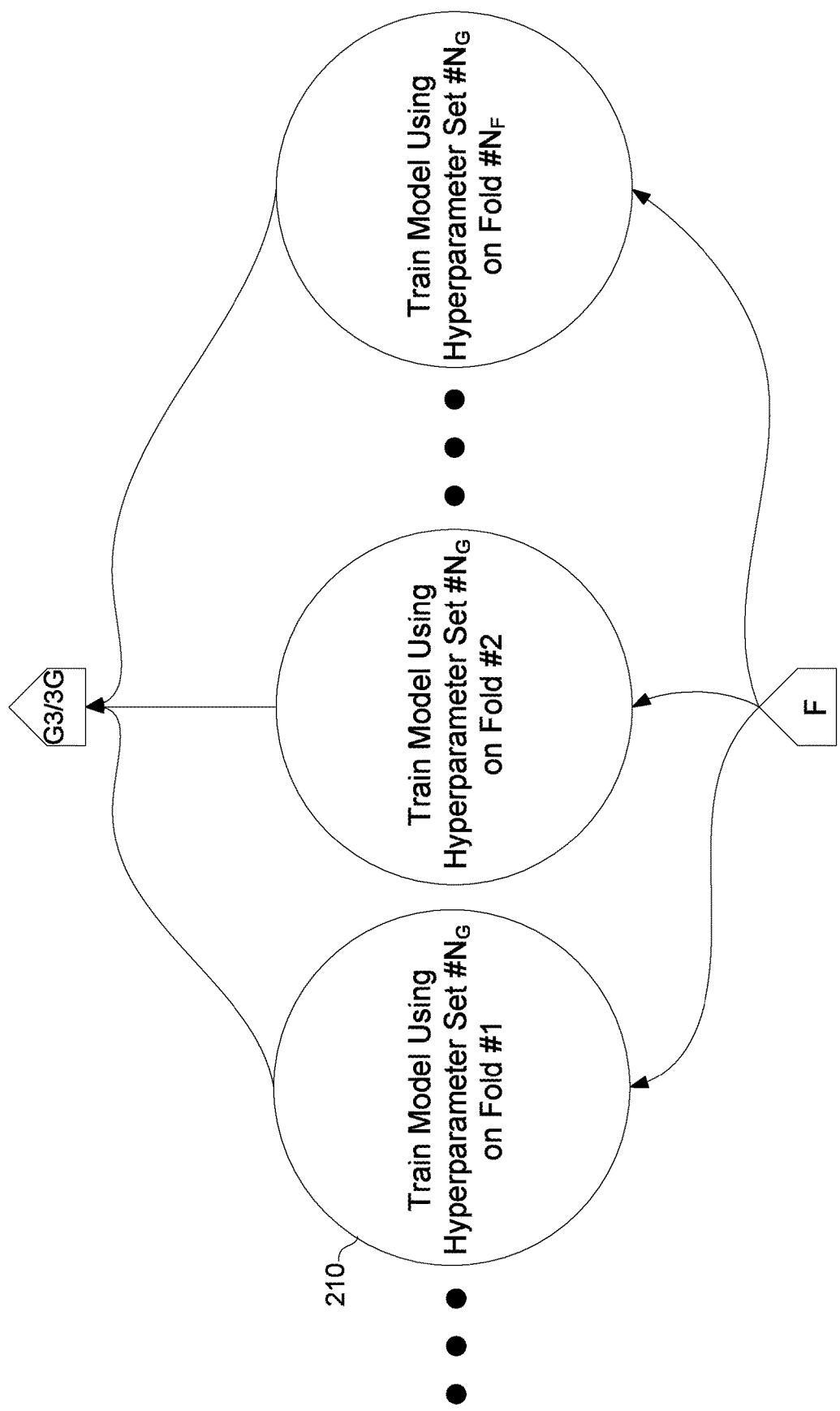
FIG. 3F illustrates one embodiment of training predictive models in parallel.

Training management module 120 is further operable to generate $N_G$ sets of hyper parameters (e.g., a set for each parallel training system 160) according to a selected hyper parameter search algorithm and distribute different hyper parameter sets to each distributed training system 160. According to one embodiment, training management module 120 is operable to invoke virtual computing resources (e.g., virtual machines, containers or other virtual computing resources) that implement model training systems 160 to train models. For example, the training management module may invoke Nts training systems 160 to test each combination of training set (e.g., fold $N_F$ for k−1 training folds) and hyper parameter set as illustrated in FIGS. 3D-3F. According to one embodiment, training management module 120 provides to each training system 160, a machine learning algorithm to use (e.g., based on the model training specification), a training set to use and a hyper parameter set to use. The parameters sent to each system 160 may be tracked.

The training modules 164 at each training system 160 include a data pipeline. As discussed above, the data pipeline provides a defined way of transforming training data from the model training input format to the format used by the machine learning algorithm. The training module 164 at each training system further applies the selected machine learning algorithm to the training sets (as transformed by the data pipeline) using the hyper parameter set provided to that training system 160 to develop a predictive model (210). Thus, multiple predictive models (e.g., candidate predictive models) can be generated in parallel.

Multiple hyper parameter sets may be tested. For example, if the model training specification specifies a hyper parameter range of 5-50 questions for a random forest algorithm, then a brute force technique may be used to train models, in parallel, on each hyper parameter value ranging from 5 to 50. Thus, for example, training management module 120 may invoke training systems 160 to perform, in parallel, training depicted in FIGS. 3D-3F using hyper parameters each set of hyper parameters.

In another embodiment, sets of hyper parameters may be determined based on a hyper parameter search algorithm. For example, hyper parameters sets having values with a range of hyper parameters values provided by in the model training specification may be determined and the hyper parameter sets distributed to training systems. Again, for example, training management module 120 may invoke training systems 160 to perform, in parallel, training depicted in FIGS. 3D-3F using each set of hyper parameters.

In another embodiment, hyper parameter sets may be tested in rounds. For example, the training of FIG. 3D may be performed in a first round using a first set of training systems 160, the training of FIG. 3E performed in a second round using a second set of training systems 160 and the training of FIG. 3F in a third round using a third set of training systems 160. For example, for the first round of training a model in response to a model training request, the hyper parameters may be selected based on settings provided in the model training specification. For a subsequent round, the hyper parameters set may be determined based on a parameter search.

In one embodiment, a brute force search may be used. Using the example above, in a first round, training may occur using a hyper parameter value of 5, in a second round training may occur using a hyper parameter value of 6 and so on. In another embodiment, instead of a brute force methodology, an initial value of a hyper parameter set may be provided, and the training and testing may iterate, first using the provided hyper parameter set, then using different hyper parameter values that are values within a predetermined distance from the previous round, values determined as potentially improving predictive performance of the model, or values selected based on other criteria. New values of hyper parameters are selected after each iteration, until a stopping criterion is met. For example, the stopping criterion may be specified as a maximum number of iterations, or as a predefined amount of difference in the effectiveness measure, from one iteration to the next, a trained model reaching a threshold level of effectiveness or other criteria being met. For example, the effectiveness may be determined as an average value across all effectiveness measure values for each iteration.

Figure 3G:
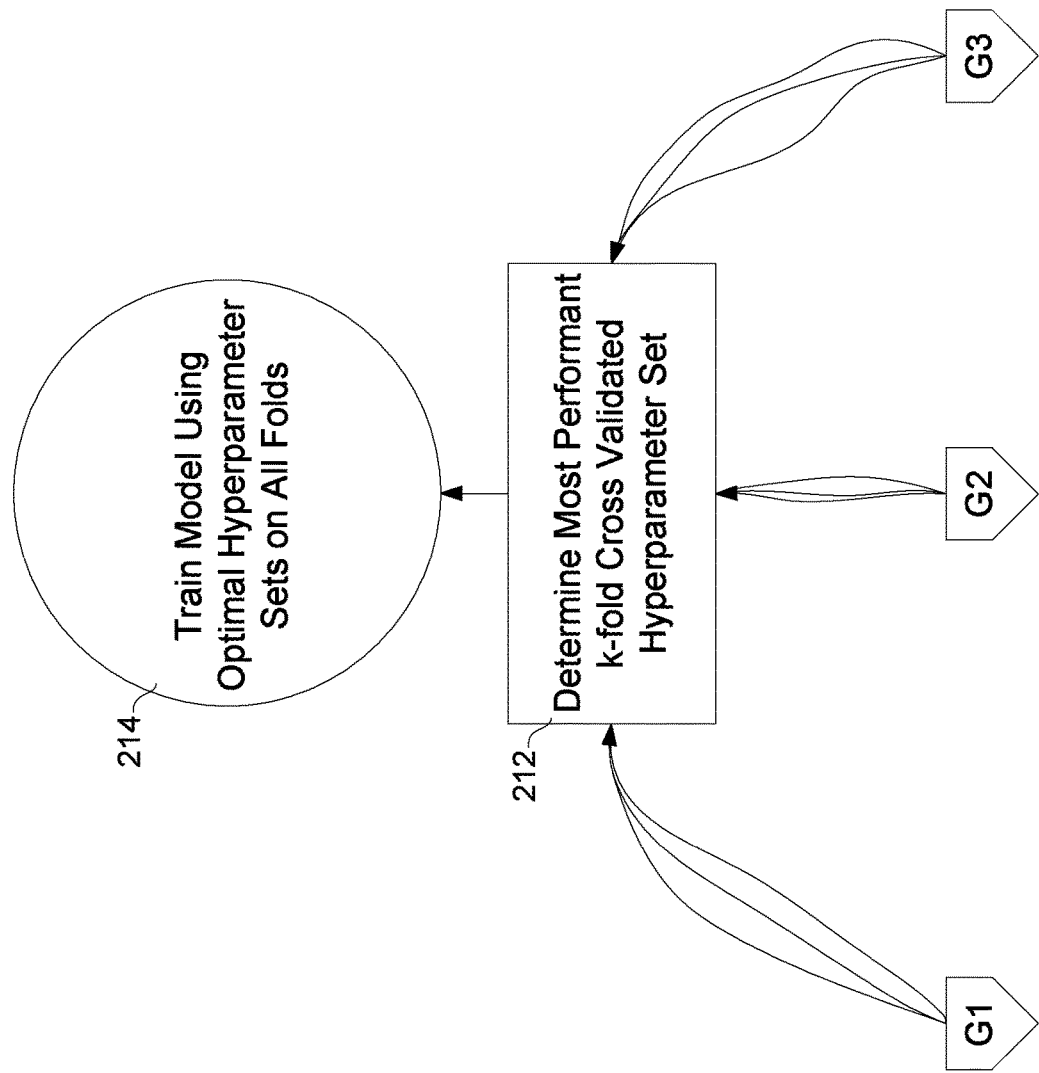
FIG. 3G illustrates one embodiment of training a production model.

Training management module 120 can be configured to evaluate the effectiveness of each of the trained predictive models (FIGS. 2, 3G). For example, management module 120 is operable to estimate the effectiveness of each trained predictive model. In some implementations, cross-validation can be used to estimate the effectiveness of each trained predictive model by applying each model to the test set. For example, the training management module 120 can provide to each of the model training systems 160 the test set of data to determine the effectiveness of the model developed by the training system. The model training module 164 can apply the transformation of the data pipeline to the test set, apply the trained machine learning model to the test set to determine a value for the dependent variable for each row in the test set and return the determined values for each row to training management module 120 (e.g., via the caching layer). In some embodiments, K rounds of cross-validation may be performed, using a different one of the sub-samples as the test sample for each round. The results from the K rounds can then be averaged, or otherwise combined, to produce a cross-validation score.

In some implementations, the effectiveness of each trained predictive model is estimated by performing cross-validation to generate a cross-validation score that is indicative of the accuracy of the trained predictive model, i.e., the number of exact matches of output data predicted by the trained model when compared to the output data included in the test set. In other implementations, one or more different metrics can be used to estimate the effectiveness of the trained model. For example, cross-validation results can be used to indicate whether the trained predictive model generated more false positive results than true positives and ignores any false negatives. For example, a confusion matrix may be used to determine a cardinality of true positives, false positives, true negatives, and false negatives, of a given trained predictive model.

In other implementations, techniques other than, or in addition to, cross-validation can be used to estimate the effectiveness. In one example, the resource usage costs for using the trained model can be estimated and can be used as a factor to estimate the effectiveness of the trained model.

Furthermore, in other implementations, a test set can be distributed to each training system 160 and the training module 164 can evaluate the effectiveness of the model generated by that system. The training module 164 can further return an effectiveness estimate to the training management system 110. Training management module 120 can compare the metrics received from each training system 160 to determine if a model should be selected or if an additional round of model training should occur and new hyper parameters generated (212).

If one or more of the trained predictive models achieves a threshold level of effectiveness or other model selection condition is met, the most effective model can be selected. Otherwise, training management module 120 can initiate a second round of model training using a new hyper parameter set, selected as discussed above. For the second round of model training, training management module 120 can compare the effectiveness of each first round model and the hyper parameters used to train each first round model and generate new sets of hyper parameters according to the selected hyper parameter search algorithm. The new hyper parameter sets can be distributed to the training systems 160 for the second round of model training. The training systems 160 in parallel to each other can apply the selected machine learning algorithm to the training sets to generate a second set of trained predictive models.

The predictive model generated by each training system 160 or effectiveness metric of the predictive model generated by each training system 160 can be returned to training management system 110 and evaluated as discussed above. Rounds of model training can be repeated using new hyper parameters until a model reaches a threshold level of effectiveness or other condition is met. In some embodiments, training rounds can be repeated until the change in effectiveness between two rounds drops below a pre-defined threshold. In any event, whether performed in multiple rounds or a single round the most performant hyper parameter set may be selected (212).

Training to select a predictive model may involve training on only a sample of the training data, or not all of the training data at one time. For example, if k-fold cross-validation was used to estimate the effectiveness of the trained models, then the selected model will not have been trained with all of the training data at the time it is selected, but rather only K−1 partitions of the training data. Accordingly, the selected predictive model can be fully trained using the training data (e.g., all K partitions), for example, by training management module 120. Once the most performant hyper parameter set is selected, a model (e.g., the model in a container having the most performant hyper parameter set) may be fully trained (214) by training the model using the complete set of training data (i.e., not holding out a fold for validation, as was done in training). According to one embodiment a virtual computing resource (e.g., virtual machine, container or other virtual computing resource) implementing a model training system 160 can be invoked to train the machine learning algorithm specified in the model training specification, using the most performant hyper parameter set, and the full set of training data. A fully trained model can thereby be generated for use in generating predictive output. The selected predictive model as fully trained can be stored by modelling system 100. For example, the code to provide the virtual machine or the container configured to execute the fully trained model can be stored.

The trained predictive model, including the selected trained model, may be output as a prediction model comprising a set of software objects with methods to implement a selected predictive model on data input into the prediction model. According to one embodiment, the trained prediction models may be models according to an Adaptive Modelling Language (AML) that comprise AML objects. A trained model may include methods to implement the data pipeline used to train the model—the data source pipeline and/or additional transformations added in the model training specification. Each trained model may further comprise a commonly named prediction function (called here ".predict") used to initiate a prediction by the model. The .predict function of each model is callable to take input in the model input format and return a prediction score (e.g., a prediction score for an applicant for credit). The trained model can process the input data using the pipeline, apply the predictive model and generate the prediction score. Each of the trained prediction models may be stored in a model repository.

It can be noted that a selected prediction model can be directly deployable as a production model usable by a decision engine. According to one embodiment, the selected model can be registered with a prediction server that provides a web framework with an API through which the .predict function may be called. According to one embodiment, the selected model can be called via a hyperlink to request a prediction score.

In some embodiments, the model training input format used to train the model is selected to match the production format such that the prediction model can receive the production formatted data when the .predict function is called and apply the same pipeline as was used in training the model. A selected trained model trained based on the model training specification can be called by the name provided with the model training specification or generated by the system. For example, when inputting the model training specification, a user may specify the model being trained is 'delinquency60, version=1p0p0.'

Embodiments of the modelling system can allow a user to provide a model training specification using relatively simple programming. FIGS. 4A, 4B, for example, illustrate one example of a model training specification. As illustrated, the model training specification provides a data source for a dependent variable 402, data sources for independent variables 404, a learning transformation pipeline of transformations 406, a machine learning algorithm 408 to apply and parameters 410 for the machine learning algorithm 408.

As shown in the example of FIG. 4B, a training template is created. Transformations for the training data (in the transformation pipeline) include dropping columns with more than 90% null values, removing highly correlated variables (with a correlation threshold of 0.9), and creation of a credit worthiness feature (specified as 5 clusters in this example).

As shown in the example of FIG. 4B, 'random forest' is specified as the machine learning algorithm 408, with the parameters 410 indicating values for 'max_depth', 'colsample_bytree', and 'subsample'. As further shown in the example of FIG. 4B, "k" (the number of folds) is specified as having a value of 4, and a random seed is specified as having a value of 123. As shown in the example of FIG. 4B, a hyper parameter optimization methodology (408) is indicated as having a 'grid' search type and an 'fbeta' validation metric. "Grid search" refers to the computationally exhaustive (and highly parallelizable) method of hyperparameter tuning. In this example, predictive performance is evaluated using fbeta, a weighted harmonic mean of precision and recall. If another performance metric is chosen, such as accuracy, a different optimal hyperparameter set could emerge from that chosen by fbeta.

A selected trained model trained based on the model training specification of FIGS. 4A, 4B can encapsulate the data pipeline and include a .predict function to call the model. The model may be referred to by a name associated with the model training specification, such as by model_id: delinquency60-1p0p0 in the rules language of U.S. Provisional Patent Application No. 62/520,597 filed Jun. 16, 2017, entitled "Computer System Decision Engine," or U.S. patent application Ser. No. 16/011,617 filed Jun. 18, 2018, entitled "Computer System Decision Engine".

As discussed in U.S. Provisional Patent Application No. 62/520,597 filed Jun. 16, 2017, entitled "Computer System Decision Engine," and U.S. patent application Ser. No. 16/011,617 filed Jun. 18, 2018, entitled "Computer System Decision Engine", a decision may reference a prediction from a prediction service. According to one embodiment, the decision engine does not know what data is required to make a prediction, but instead calls over to the prediction service and the prediction service informs the decision engine of the data needed for the prediction. For example, if a decision engine makes a call to a prediction service for a "delinquency60-1p0p0" prediction, the prediction service can inform the decision engine of the data sources or other data needed to make the prediction (e.g., 'AgencyAReportSoft', version='1p0', 'IncomeReport', version '1p1' (414)). In response, the decision engine can collect an instance of data sources as described in U.S. Provisional Patent Application No. 62/520,597 filed Jun. 16, 2017, entitled "Computer System Decision Engine," or U.S. patent application Ser. No. 16/011,617 filed Jun. 18, 2018, entitled "Computer System Decision Engine".

It can be noted that the version 1p0 may simply indicate a particular version of data to request or retrieve the requesting service without having any awareness of the data pipeline it signifies to the model. The decision engine can pass the data source instances or other data to the prediction service (e.g., pass the JSON formatted Credit Agency A soft credit pull record for the consumer being evaluated to the prediction service). The prediction service can apply the selected trained delinquency60,version=1p0p0 model to the received record to generate an output indicating whether the consumer is predicted to be delinquent and pass the results to the decision engine. The decision engine can receive the results of the requested prediction from the prediction service to apply the rule that referenced the prediction. The instance of the prediction, the version, and data used to generate the prediction may be stored in the data warehouse.

Figure 5:
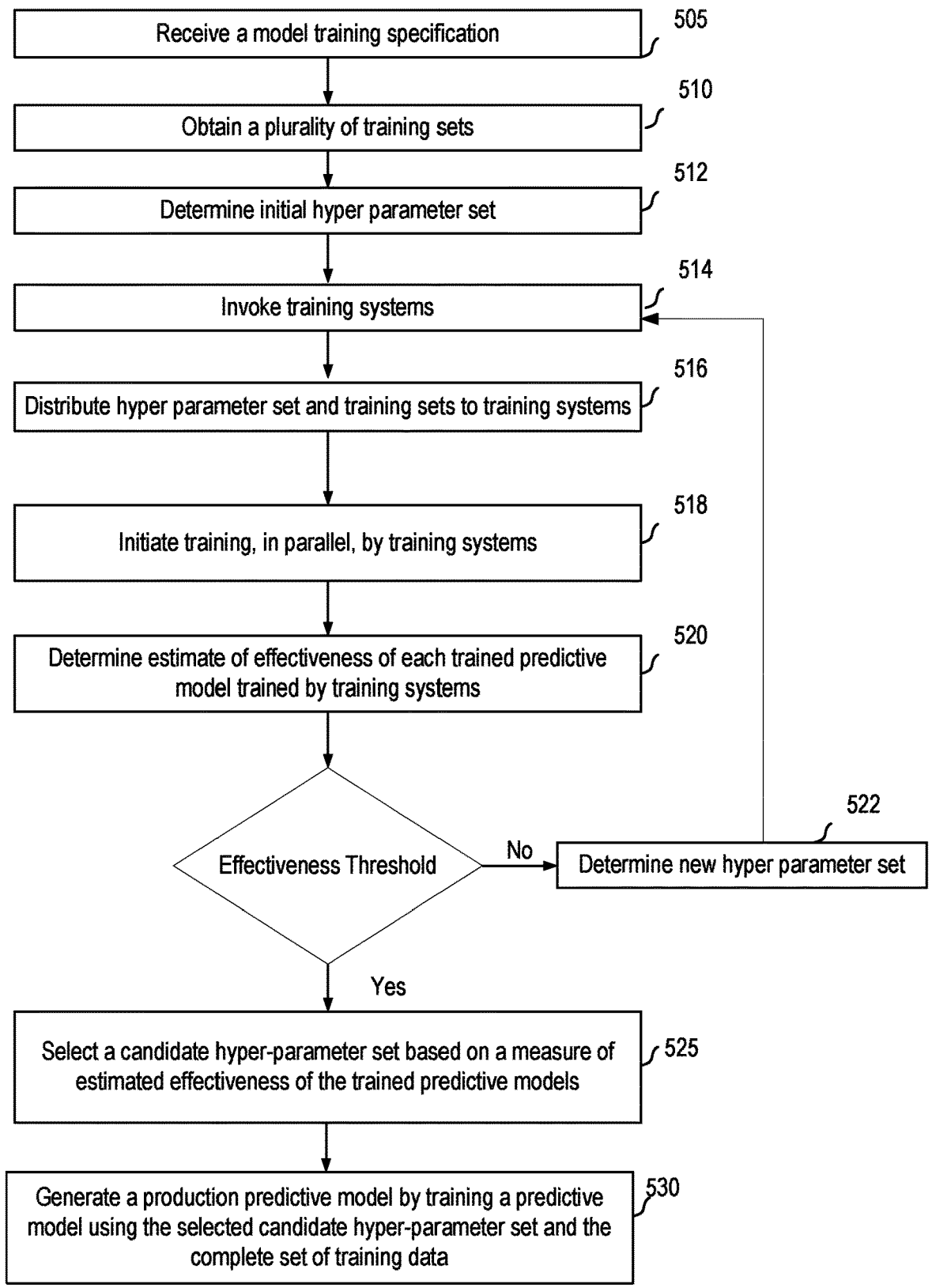
FIG. 5 is a flowchart illustrating operation of an embodiment for building, training and productionizing machine learning models.

FIG. 5 is a flowchart illustrating operation of an embodiment for building, training and productionizing machine learning models. At 505, a model training specification is received. At 510, a plurality of training sets are obtained, each training set representing a different portion of a complete set of training data. At step 512, initial hyper parameter sets are determined. In one embodiment, the initial hyper parameter sets may be based on a hyper parameter set specified in a model training specification. At 514, training systems are invoked to train models based on the training sets and hyper parameter sets. For example, virtual machines or containers that implement training systems may be invoked.

At 516, the plurality of training sets and sets of hyper parameters are distributed to each of a plurality of distributed training systems. At 518, training of a plurality of predictive models is initiated, in parallel, by the plurality of distributed training systems, according to the received model training specification, the distributed hyper-parameter sets, and using a different portion of a complete set of training data for each respective one of the distributed training systems.

At step 520, an estimate of the effectiveness of each trained model is determined. If a threshold estimated effectiveness is not reached by any of the trained models, a new hyper parameter set is determined (step 522). Steps 514-520 are repeated for the new hyper parameter set to train models and determine the effectiveness of the models using the new hyper parameter set. Steps 514-522 can be repeated until a stopping criterion is met, such as a predetermined number of training rounds are performed or, as illustrated, a trained model reaches an estimated effectiveness threshold.

In other embodiments, distributed training systems may train models using different hyper parameter sets in parallel. In other words, multiple hyper parameter sets are determined at step 514 and distributed at step 516 for use by training systems training models in parallel.

At step 525, a hyper-parameter set of the plurality of sets of hyper-parameters is selected, based on a measure of estimated effectiveness of the trained predictive models. At 530, a production predictive model is generated by training a predictive model using the selected candidate hyper-parameter set and the complete set of training data.

Examples of machine learning algorithms, for implementation, may include open source packages such as XGBoost ("Extreme Gradient Boosting") and SKLearn (from Scikit Learn). For example, XGBoost is a decision tree based algorithm, with hyper parameters available such as learning rate, min child weight, max depth, max leaf nodes, column sample, and row sample. For example, SKLearn is an open source package that contains a collection of machine learning algorithms. For example, a random forest algorithm may provide hyper parameters such as max tree depth, column sample, row sample, and min samples leaf. For example, SKLearn additionally may provide logistic regression with L1 and L2 regularization.

Examples of hyper parameter optimization, for implementation, may include grid search and random search.

As an example for implementation, Luigi may be used as a data pipeline workflow manager. For example, this may be used as a central controller to make decisions regarding what is to be trained next. According to one embodiment, DOCKER containers may be deployed for fetching data, as well as for training and deploying models. The DOCKER container that has the best model may be selected and deployed into the production environment. As an example for implementation, Kubernetes is an open-source container-orchestration system that may be used for automating deployment, scaling and management of containerized applications.

Embodiments of a hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylus, etc.), or the like. In various embodiments, the computer has access to at least one database over the network.

ROM, RAM, and HD are computer memories for storing computer instructions executable (in other which can be directly executed or made executable by, for example, compilation, translation, etc.) by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system comprising:
a device processor; and
a non-transitory computer readable medium storing instructions executable by the device processor to:
receive a model training specification;
determine a plurality of hyper parameter sets, the plurality of hyper parameter sets comprising a first hyper parameter set and a second hyper parameter set for training a type of predictive model specified in the model training specification;
distribute the first hyper parameter set to each of a first set of distributed training systems;
initiate fetching of raw training data from a plurality of data sources;
initiate merging and preprocessing of the fetched raw training data;
initiate merging of row sets from the merged and preprocessed fetched raw training data;
determine a plurality of folds of training data, each fold including a portion of the merged row sets;
initiate training of a first plurality of predictive models, in parallel, by the first set of distributed training systems, based on the received model training specification, using the first hyper parameter set, and using a different portion of a complete set of training data for each respective one of the first set of distributed training systems;
distribute the second hyper parameter set to each of a second set of distributed training systems;
initiate training of a second plurality of predictive models, in parallel, by the second set of distributed training systems, based on the received model training specification, using the second hyper parameter set, and using a different portion of a complete set of training data for each respective one of the second set of distributed training systems;
select a candidate hyper parameter set of the plurality of hyper parameter sets, based on a measure of estimated effectiveness of each of the first plurality of predictive models and second plurality of predictive models; and
generate a production predictive model by training a predictive model using the selected candidate hyper parameter set and the complete set of training data.

2. The system of claim 1, wherein the model training specification specifies a machine learning algorithm for training predictive models.

3. The system of claim 1, wherein the model training specification specifies a hyper-parameter search space for training predictive models.

4. The system of claim 1, wherein the model training specification specifies a data source for training predictive models.

5. The system of claim 1, wherein the instructions are executable by the device processor to:
initiate cleaning of the merged and preprocessed fetched raw training data.

6. The system of claim 1, wherein the instructions are executable by the device processor to:
initiate storing of the merged and preprocessed fetched raw training data in a caching layer.

7. The system of claim 1, wherein the distributed training systems comprise software containers that are configured based on the received model training specification.

8. The system of claim 1, wherein the instructions are configured to initiate training of the first plurality of predictive models and second plurality of predictive models in parallel.

9. A non-transitory computer readable medium storing instructions that are executable by a device processor to:
receive a model training specification;
determine a plurality of hyper parameter sets, the plurality of hyper parameter sets comprising a first hyper parameter set and a second hyper parameter set for training a type of predictive model specified in the model training specification;
distribute the first hyper parameter set to each of a first set of distributed training systems;
initiate fetching of raw training data from a plurality of data sources;
initiate merging and preprocessing of the fetched raw training data;
initiate merging of row sets from the merged and preprocessed fetched raw training data;
determine a plurality of folds of training data, each fold including a portion of the merged row sets;
initiate training of a first plurality of predictive models, in parallel, by the first set of distributed training systems, based on the received model training specification, using the first hyper parameter set, and using a different portion of a complete set of training data for each respective one of the first set of distributed training systems;
distribute the second hyper parameter set to each of a second set of distributed training systems;
initiate training of a second plurality of predictive models, in parallel, by the second set of distributed training systems, based on the received model training specification, using the second hyper parameter set, and using a different portion of a complete set of training data for each respective one of the second set of distributed training systems;
select a candidate hyper parameter set of the plurality of hyper parameter sets, based on a measure of estimated effectiveness of each of the first plurality of predictive models and second plurality of predictive models; and generate a production predictive model by training a predictive model using the selected candidate hyper parameter set and the complete set of training data.

10. The non-transitory computer readable medium of claim 9, wherein the model training specification specifies a machine learning algorithm for training predictive models.

11. The non-transitory computer readable medium of claim 9, wherein the model training specification specifies a hyper-parameter search space for training predictive models.

12. The non-transitory computer readable medium of claim 9, wherein the model training specification specifies a data source for training predictive models.

13. The non-transitory computer readable medium of claim 9, wherein the instructions are executable by the device processor to:
   initiate cleaning of the merged and preprocessed fetched raw training data.

14. The non-transitory computer readable medium of claim 9, wherein the instructions are executable by the device processor to:
   initiate storing of the merged and preprocessed fetched raw training data in a caching layer.

15. The non-transitory computer readable medium of claim 9, wherein the distributed training systems comprise software containers that are configured based on the received model training specification.

16. The non-transitory computer readable medium of claim 9, wherein the instructions are configured to initiate training of the first plurality of predictive models and second plurality of predictive models in parallel.

17. A method of building, training and productionizing machine learning models, the method comprising:
   receive a model training specification;
   determine a plurality of hyper parameter sets, the plurality of hyper parameter sets comprising a first hyper parameter set and a second hyper parameter set for training a type of predictive model specified in the model training specification;
   distribute the first hyper parameter set to each of a first set of distributed training systems;
   initiate fetching of raw training data from a plurality of data sources;
   initiate merging and preprocessing of the fetched raw training data;
   initiate merging of row sets from the merged and preprocessed fetched raw training data;
   determine a plurality of folds of training data, each fold including a portion of the merged row sets;
   initiate training of a first plurality of predictive models, in parallel, by the first set of distributed training systems, based on the received model training specification, using the first hyper parameter set, and using a different portion of a complete set of training data for each respective one of the first set of distributed training systems;
   distribute the second hyper parameter set to each of a second set of distributed training systems;
   initiate training of a second plurality of predictive models, in parallel, by the second set of distributed training systems, based on the received model training specification, using the second hyper parameter set, and using a different portion of a complete set of training data for each respective one of the second set of distributed training systems;
   select a candidate hyper parameter set of the plurality of hyper parameter sets, based on a measure of estimated effectiveness of each of the first plurality of predictive models and second plurality of predictive models; and
   generate a production predictive model by training a predictive model using the selected candidate hyper parameter set and the complete set of training data.

18. The method of claim 17, wherein the model training specification specifies a machine learning algorithm for training predictive models.

19. The method of claim 17, wherein the model training specification specifies a hyper-parameter search space for training predictive models.

20. The method of claim 17, wherein the model training specification specifies a data source for training predictive models.

* * * * *